D. N. GROSS.
GAS HEATING STOVE.
APPLICATION FILED DEC. 26, 1918.

1,313,813.

Patented Aug. 19, 1919.

Inventor:
D. N. Gross
E. W. Anderson

By
Attorneys

UNITED STATES PATENT OFFICE.

DANIEL N. GROSS, OF SOUTH FORT SMITH, ARKANSAS.

GAS HEATING-STOVE.

1,313,813.   Specification of Letters Patent.   Patented Aug. 19, 1919.

Application filed December 26, 1918. Serial No. 268,313.

*To all whom it may concern:*

Be it known that I, DANIEL N. GROSS, a citizen of the United States, resident of South Fort Smith, in the county of Sebastian and State of Arkansas, have made a certain new and useful Invention in Gas Heating-Stoves; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
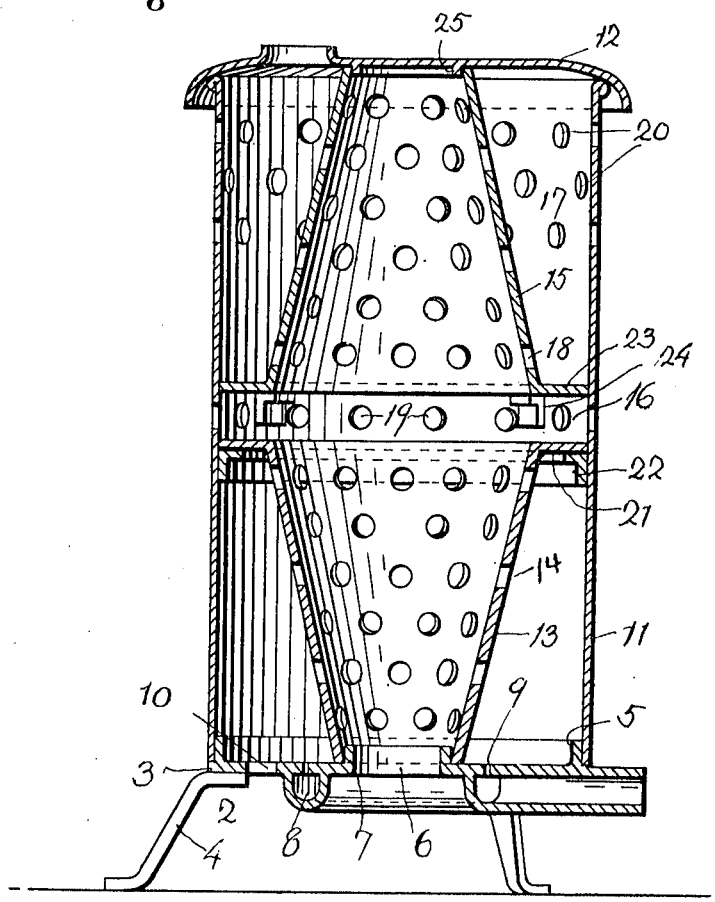
Figure 1 is a central vertical section of the invention on the line 1—1, Fig. 2.
Figure 2:
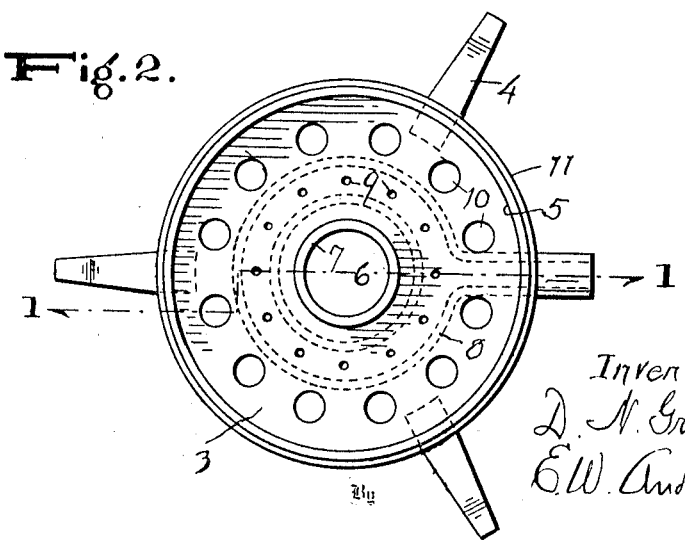
Fig. 2 is a detail plan view of the base.

The invention has relation to gas heating stoves, and has for its object to provide an improved stove, giving an increased heat with a lesser expenditure of fuel, being of simple and durable construction, and burning substantially without odor.

The invention consists in the novel construction and arrangement of parts, as hereinafter set forth.

In the accompanying drawings illustrating the invention, the numeral 2, designates a base, usually of cast iron, having a horizontal bottom 3, supported by legs 4, said bottom having an annular raised marginal flange 5, and a central opening 6, the latter having also an annular raised marginal flange 7, a tubular burner ring 8, communicating with an inner series of burner perforations 9, of the bottom, which has also an outer series of air admitting perforations 10.

Fitting upon the bottom 3, in close relation to its outer flange, is a vertical cylindrical drum 11, and fitting upon the drum is a top piece 12, of the usual character.

Located within the drum or casing of the stove is an inverted hollow frusto-conical heating element 13, of suitable metal, as cast iron, having its lower contracted end engaging the flange 7, said element being provided with perforations 14, and the outwardly and upwardly extending side wall thereof overlying the burner holes 9, the flames issuing from said holes impinging or striking against the overhanging side wall of the heating element, and the latter becoming thereby heated red hot, air passing upwardly through the interior of said element from opening 6, and issuing from perforations 14, whereby any unconsumed gas is caused to be ignited and entirely consumed.

It is preferred to use also above the inverted frusto-conical heating element a second heating element 15, also of hollow frusto-conical form, but not inverted, the two elements being spaced apart by a horizontal space 16, the upper element also spaced apart from the drum by an annular space 17, and provided with perforations 18.

The drum is provided with air-inlet perforations 19 in line with the horizontal space 16, between the two heating elements, air passing therethrough, upwardly within the upper heating element and out through the perforations thereof. The lower enlarged end of the upper element is adapted to catch any gas that may be unconsumed and escape upwardly from the lower element, the air issuing from the perforations 18, uniting with said gas and causing the same to be entirely consumed.

The drum is provided with upper perforations 20, for exit of hot air from the stove. The lower heating element is usually provided with an upper outwardly extending flange 21, resting upon a suitable support 22 of the drum, and the upper heating element with a lower outwardly extending flange 23, resting upon a support or supports 24 of said drum. The upper end of the upper element usually engages a downwardly extending flange 25, of the top of the stove, said upper end being closed by said top.

It is found in practice that both heating elements will become red hot in a very few minutes after lighting, and that the stove will become heated without appreciable odor.

I claim:

In a gas heating stove, a bottom provided with a central air opening, and an annular burner surrounding said opening, a drum fitting upon said bottom, a cover for said drum, and a heating device including a lower downwardly tapering portion communicating at its lower contracted end with said central perforation, and an upper upwardly tapering portion, said drum having air admitting perforations communicating with the middle portion of said heating device, both the upper and lower portions of the latter being spaced apart from the drum by an annular space and provided with perforations.

In testimony whereof I affix my signature in presence of two witnesses.

DANIEL N. GROSS.

Witnesses:
IRENE LINGO,
E. F. DOOLEY.